United States Patent [19]
Wu et al.

[11] Patent Number: 6,035,436
[45] Date of Patent: Mar. 7, 2000

[54] METHOD AND APPARATUS FOR FAULT ON USE DATA ERROR HANDLING

[75] Inventors: William S. Wu, Cupertino; Len J. Schultz, San Jose, both of Calif.

[73] Assignee: Intel Corporation, Santa Clara, Calif.

[21] Appl. No.: 08/882,595

[22] Filed: Jun. 25, 1997

[51] Int. Cl.[7] .................................................. G06F 11/08
[52] U.S. Cl. ..................... 714/797; 714/723; 714/757; 714/764; 714/769; 714/773
[58] Field of Search .................................. 714/797, 723, 714/751, 764, 769, 773

[56] References Cited

U.S. PATENT DOCUMENTS

| | | | |
|---|---|---|---|
| 5,321,703 | 6/1994 | Weng | 371/36 |
| 5,410,545 | 4/1995 | Porter et al. | 371/21.6 |
| 5,754,567 | 5/1998 | Norman | 371/40.18 |
| 5,774,482 | 6/1998 | Grewal | 371/40.2 |

Primary Examiner—Albert De Cady
Assistant Examiner—Jason Greene
Attorney, Agent, or Firm—Blakely, Sokoloff, Taylor & Zafman LLP

[57] ABSTRACT

A method for handling different of types of data bit errors in a computer system. In one embodiment, the method comprises the step of storing a data line in a first storage location. The method also includes the step of retrieving the data line from the first storage location. Data bit errors in the data line are detected and the data line is marked as containing a data bit error and stored in a storage location if the data line is not to be used immediately by a requesting process; otherwise error handling is performed by halting the requesting process.

12 Claims, 3 Drawing Sheets

METHOD AND APPARATUS FOR FAULT ON USE DATA ERROR HANDLING

FIELD OF THE INVENTION

The present invention is in the field of data error handling in computer systems.

BACKGROUND OF THE INVENTION

Data stored in transistor integrated circuit devices is subject to spontaneous errors resulting from physical changes in the integrated circuit. These errors can be permanent errors or non-permanent errors. In the case of permanent errors, integrated circuit transistors storing individual data bits have permanently failed. Temporary errors, on the other hand, are often a result of radiation, such as cosmic radiation or radiation from decay of radioactive material. These temporary, or soft errors occur at random locations and times. Soft errors occur with greater frequency in systems that have larger and denser memory arrangements. Because it is the industry trend to include more memory capability in a smaller area, soft errors become an increasingly significant problem.

One method for detecting and correcting soft errors in stored data involves storing along with the data one or more error correction code (ECC) bits. An algorithm is used to generate an ECC word associated with a predetermined number of data bits to be stored. When the stored data bits are retrieved from a memory device, along with their associated ECC word, the ECC word is "decoded", or checked, allowing the detection of single or multiple bit errors. Errors detected this way are sometimes correctable. For example, an error involving a single bit is usually correctable, but errors involving more than one bit usually are not.

In conventional computer systems including a processor and a memory subsystem, the processor checks data requested from a memory subsystem when it is received. Errors may best be detected at this stage. Conventional computer systems also perform ECC checking at the memory subsystem side when data is written to a memory subsystem from, for example, a cache associated with a processor. This latter type of error detection often occurs asynchronously with respect to the processor instruction execution stream. In other words, in the latter type of error detection, an error is detected in data as a result of a system "housekeeping" process rather than as a result of the data being requested by a particular process. Because it is usually not possible to identify a process that requested the data in which an error has been detected in this type of error detection, handling of the error requires halting of all processes active on the system, including sometimes the processor kernel. This is equivalent to a system reset. The system reset or a halt of all active processes potentially makes the system and stored data unavailable to users for the period required to handle the error. This is especially significant in a server environment where system downtime must be minimized. For these reasons, handling errors caused by housekeeping processes such as, for example, a write-back to main memory in which the data is not actually required for use by any process, becomes extremely inefficient and wasteful.

SUMMARY OF THE INVENTION

A method for handling different types of data bit errors in a computer system is described. In one embodiment, the method comprises the step of storing a data line in a first storage location. The method also includes the step of retrieving the data line from the first storage location. Data bit errors in the data line are detected and the data line is marked as containing a data bit error and stored in a storage location if the data line is not to be used immediately by a requesting process; otherwise error handling is performed by halting the requesting process.

DETAILED DESCRIPTION

A method and apparatus for economically and efficiently handling data bit errors in a computer system is described. According to one embodiment, data errors are handled when a data element is actually requested by a process; otherwise, the data is marked as having an error and stored.

Figure 1:
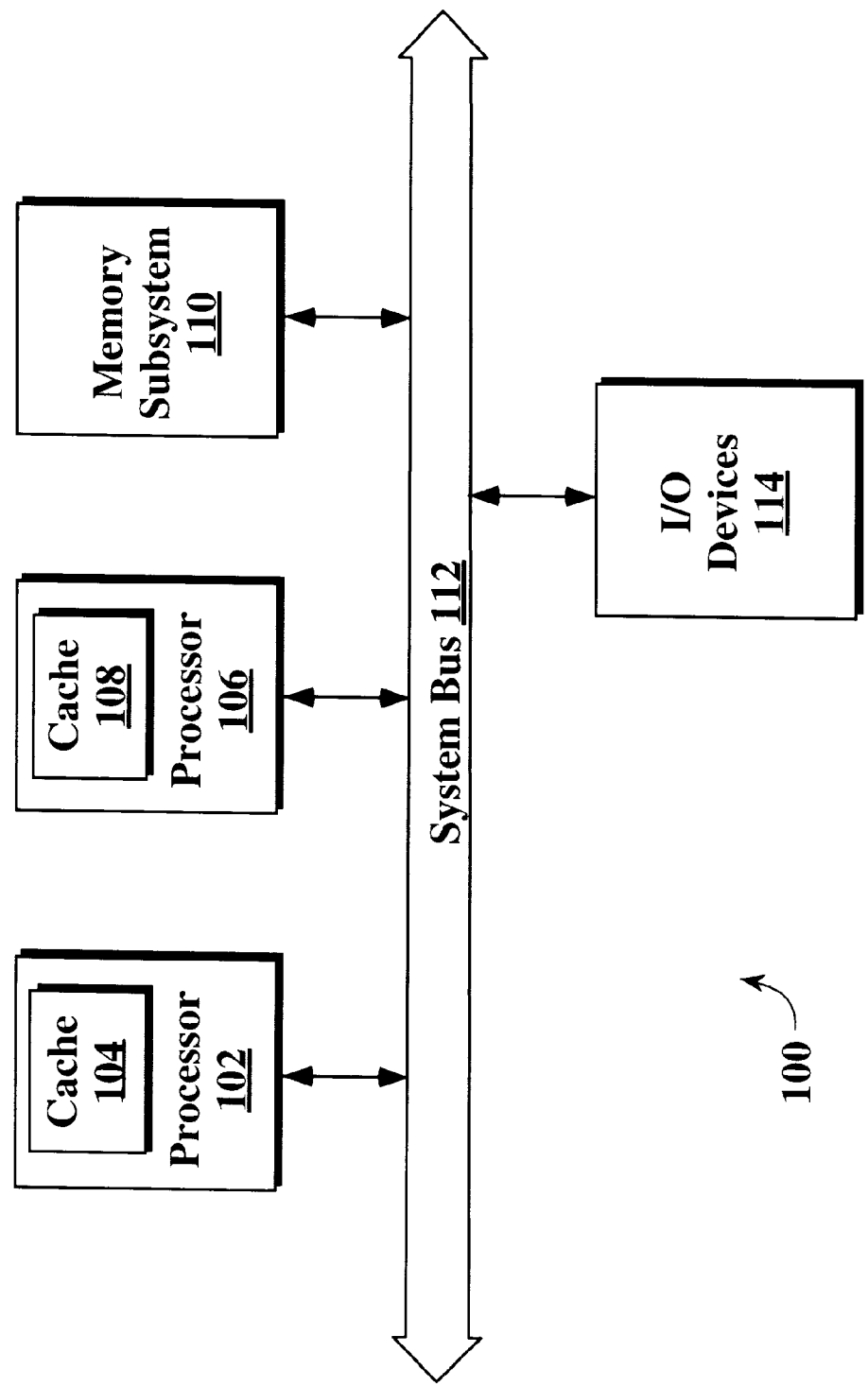
FIG. 1 is a block diagram of a portion of a computer system according to the present invention.

FIG. 1 is a block diagram of a portion of computer system 100. Computer system 100 includes processors 102 and 106. Each of processors 102 and 106 include internal caches. Processor 102 includes internal cache 104 and processor 106 includes internal cache 108. Internal caches 104 and 108 share an integrated circuit die with their respective processors. Processors 102 and 106 are connected to system bus 112. Memory subsystem 110 is also coupled to system bus 112. Computer system 100 also includes input/output (I/O) devices 114. I/O devices 114 can include such devices as a keyboard, a cursor control device, and a modem.

Figure 2:
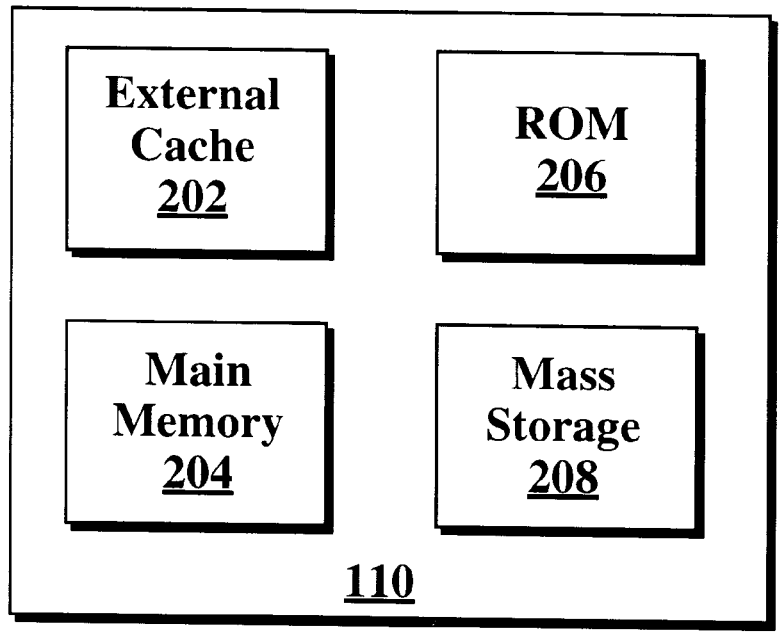
FIG. 2 is a block diagram of a memory subsystem according to one embodiment.

FIG. 2 is a block diagram of memory subsystem 110 according to one embodiment of the invention. Memory subsystem 110 comprises memory devices external to processors 102 and 106. Memory subsystem 110 includes external cache 202 and main memory 204, which is comprised of random access memory (RAM). Memory system 110 also includes read only memory (ROM) 206 and mass storage device 208.

According to the present invention, data is stored in units called data lines in caches 104 or 108 or in memory subsystem 110. In one embodiment, a line comprises 64 bits of data. In one embodiment, system bus 112 uses an ECC code that can correct single bit errors, detect double bit errors, and mark a line of data as containing an error (being "poisoned"). According to known algorithms, an 8-bit ECC word is generated from 64 data bits in a line in this embodiment. An ECC word of 8 bits is generated for a 64 bit line of data before it is stored in caches 104, 108 or in memory subsystem 110. When a data line is read from a storage location, the line may be checked by using the 64 data bits and 8 ECC bits to compute 8 syndrome bits. A value transmitted with ECC bits is correct if all the computed syndrome bits are 0. If any syndrome bit is 1, then an ECC error has occurred. Any single bit error in data or check bits can be corrected using a syndrome bit. According to one embodiment, the ECC code can detect any double bit error, poisoned data (i.e., a data line containing an error), any error up to 4 bits, and a single nibble error if all other nibbles are correct.

Data may be transferred between storage devices in computer system 100 for various purposes. On some occasions, data is transferred from one memory device to another because the data has been requested for immediate use by a process. On other occasions, data may be transferred from one storage device to another, but is not required for use by any process. An example of this is a write-back transaction. In a write-back transaction, data which has been previously modified and stored in a cache (as "dirty" data) is evicted from the cache and written into the memory subsystem, usually to update the main memory which holds an older version of the same data line. In the write-back transaction, the process that modifies the data is probably no longer active and thus, the data line is not currently required.

According to the present invention, a distinction is made between the errors detected in data lines requested by processes, and errors detected in data lines not requested by processes. In computer system 100, a transaction such as a write-back transaction involving data which is not immediately required by a process is not handled, but rather written to the memory subsystem after ECC checking occurs at the memory subsystem. According to the present invention, if a single bit correctable error is discovered at this time, it is corrected. If a double bit (uncorrectable) error is detected it is marked (the data is poisoned) using an ECC bit and the data is stored without handling the error at this time. The error is handled when and if the marked line of data is requested for latter use by a process. At that time, the mark will be detected by the requesting process and the error will be handled. At the time that the error is handled, however, the process that requested the data will be known. Therefore, only that process is required to be halted, or killed. Thus, according to the present invention, asynchronous data errors are made synchronous with respect to the instruction execution stream, and system availability is increased.

Processors 102 and 106, memory subsystem 110, and I/O devices 114 may all take control of system bus 112 at various times. At these times the devices become bus agents.

Figure 3:
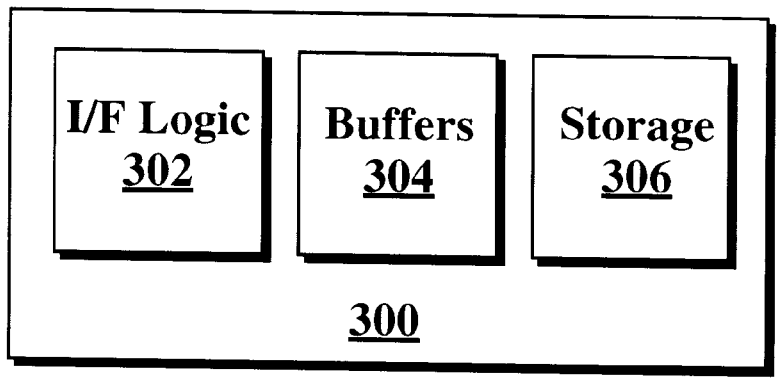
FIG. 3 is a block diagram of a bus agent according to one embodiment.

FIG. 3 is a block diagram of generic bus agent 300 according to an embodiment of the present invention. Bus agent 300 includes interface logic 302, buffer circuitry 304, and storage circuitry 306. Bus agent 300 communicates with system bus 112 and with other bus agents in system bus 112 through interface logic 302. In order for bus agent 300 to conduct transactions over system bus 112 it must gain control of system bus 112 by communicating according to the protocol recognized by system bus 112. When bus agent 300 receives data from other agents or transmits data to other agents, it may temporarily store lines of data in buffer circuitry 304 in order to facilitate transfer. Lines of data are stored in storage circuitry 306 until they are requested by another bus agent.

Buffer circuitry 304 is used to store a bit used in one embodiment to mark an associated data line as containing an uncorrectable error. When another bus agent requests the line of data from bus agent 300, interface logic 302 transmits the marker and the data line to the requester. When bus agent 300 receives a line of data, interface logic 302 processes the accompanying ECC bits, and if it is determined that the associated data line contains an uncorrectable error, a marking bit will be stored in buffer circuitry 304 to so indicate. If the ECC bits indicate that a correctable error exists, the error will be corrected using the ECC bits.

Figure 4:
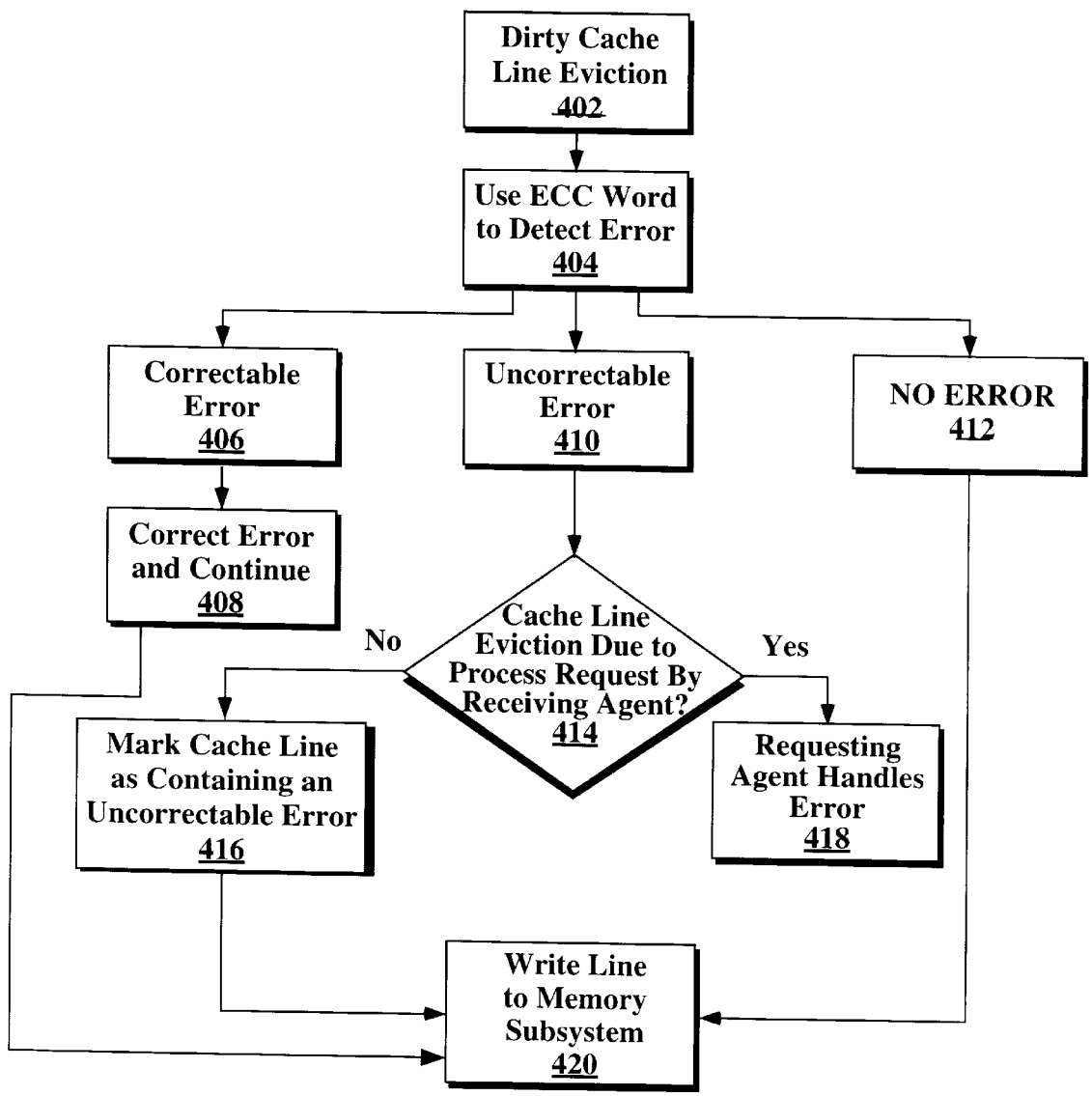
FIG. 4 is a flow chart of a cache line eviction according to one embodiment.

FIG. 4 shows flow chart 400 which illustrates events occurring upon eviction of a dirty cache line. At block 402 a dirty cache line is evicted, or transmitted from a storage location. As is known in the art, a dirty cache line is one which has been modified by a process but not yet copied in its modified form to a memory subsystem. At block 404 the receiving bus agent uses the ECC word associated with the cache line to detect any error. Three cases are possible, namely, no error, a correctable error, or an uncorrectable error. In the case of a correctable error, as shown in block 406, the error is immediately corrected at block 408 and the evicted line is written to the memory subsystem.

At block 410 an uncorrectable error is detected. In this case a determination is made whether the cache line eviction is from an agent that is to receive the data for use in an active process or due to a memory-to-memory transaction such as a write-back operation. If the cache line is evicted due to a request by the receiving agent the uncorrectable error is handled by the receiving agent at block 418. Because the process associated with the request is active at this time, it is possible to handle the error by halting only the requesting process. Thus, by handling errors only when they can be associated with a particular process, less disruptive error handling and increased system availability is achieved.

If the cache line eviction is not due to a process request by a receiving agent, then an uncorrectable error is not handled at this time, but is marked at block 416. The marked data line is then written to the memory subsystem at block 420.

Finally, if no error is detected by the receiving bus agent at block 412, the data line with its ECC code is written into the memory subsystem at block 420.

In one embodiment, the ECC word is also used to encode a source of any uncorrectable errors detected. Specifically, if an error is detected in the cache line after storage in a processor cache, such as cache 104 or cache 108, the ECC word would receive one encoding. If an uncorrectable error is detected after the cache line was stored in the memory subsystem, the ECC word would receive another encoding. When these cache lines are eventually used, i.e., when the associated ECC word is decoded, information is collected regarding whether the source of the error was a processor or a memory subsystem. In this way it is possible to collect statistics over time regarding the robustness of processor memory and of the memory subsystem. This allows a system designer to isolate sources of uncorrectable errors and design future systems accordingly.

Although the present invention has been described in terms of specific embodiments, it will be appreciated that various modifications and alterations might be made by one ordinarily skilled in the art without departing from the broader spirit and scope of the invention as set forth in the following claims.

What is claimed is:

1. A method of operation for a computer system that includes a memory subsystem and a system bus coupled to a plurality of bus agents, which includes at least one processor having an internal cache, the method comprising:
   evicting a dirty line from the internal cache;
   using an ECC word associated with the dirty line to detect a data error;
   determining whether the data error is a correctable type of error or an uncorrectable type of error, if the data error is a correctable type of error:
      correcting the data error to produce a corrected line; and
      writing the corrected line to the memory subsystem; otherwise
   determining whether the dirty line was evicted due to a process request by a receiving bus agent; if so,
      handling the data error by the receiving bus agent; else, marking the dirty line to produce a marked cache line; and writing the marked cache line to the memory subsystem.

2. The method according to claim 1 wherein the marking step comprises storing a marker bit in a buffer circuit.

3. The method according to claim 1 wherein the step of writing the marked cache line to the memory subsystem further includes transmitting the marker bit to the memory subsystem.

4. The method according to claim 1 further comprising encoding a source of the data error when the data error is the uncorrectable type of error.

5. The method according to claim 4 wherein the marking step comprises storing a marker bit in a buffer circuit.

6. The method according to claim 1 further comprising collecting statistics regarding sources of uncorrectable types of errors over time.

7. The method according to claim 1 wherein the uncorrectable type of error comprises a double bit error.

8. A computer system comprising:

a system bus;

a plurality of bus agents each having interface logic to communicate on the system bus according to a protocol, the plurality of bus agents including:

a processor having an associated cache;

a memory subsystem;

wherein a bus agent marks an ECC bit associated with a data line having an uncorrectable error when a memory-to-memory transaction of the data line is performed, the uncorrectable error being handled only if and when the data line is requested by a process associated with a requesting bus agent.

9. The computer system of claim 8 wherein the interface logic comprises a buffer to store the ECC bit.

10. The computer system of claim 8 wherein the memory-to-memory transaction comprises a write-back transaction.

11. The computer system of claim 8 wherein only the process is halted during handling of the uncorrectable error.

12. The computer system of claim 8 wherein the uncorrectable error comprises a double bit error.

* * * * *